United States Patent [19]
Lee

[11] 4,029,248
[45] June 14, 1977

[54] DETACHABLE BATTERY CARRYING HANDLE

[75] Inventor: Chin-Chuan Frederic Lee, Bloomington, Minn.

[73] Assignee: Gould Inc., Rolling Meadows, Ill.

[22] Filed: May 27, 1975

[21] Appl. No.: 581,163

[52] U.S. Cl. .................. 224/45 F; 429/121; 429/163
[51] Int. Cl.² .................................. A45C 71/00
[58] Field of Search ............... 224/45 F, 45 P; 294/31.2; 220/96, 91; 136/166, 181

[56] References Cited
UNITED STATES PATENTS

| | | | |
|---|---|---|---|
| 1,360,056 | 11/1920 | Tiner | 220/91 |
| 2,176,711 | 10/1939 | Gorman, Jr. | 220/91 |
| 2,270,563 | 1/1942 | Schnebelen | 224/45 F |
| 2,501,572 | 3/1950 | Marquez | 220/96 |
| 2,913,275 | 11/1959 | Rocca | 220/91 |
| 2,999,714 | 9/1961 | Ritchie | 224/45 P |
| 3,093,515 | 6/1963 | Rector | 136/166 |
| 3,275,366 | 9/1966 | Hidding | 220/96 |
| 3,339,794 | 9/1967 | Oberlander et al. | 220/91 |
| 3,415,414 | 12/1968 | Gonzalez | 220/91 |
| 3,956,022 | 5/1976 | Fox | 136/181 |

FOREIGN PATENTS OR APPLICATIONS

| 214,232 | 9/1956 | Australia | 224/45 F |
|---|---|---|---|

Primary Examiner—L. J. Paperner
Assistant Examiner—Kenneth Noland
Attorney, Agent, or Firm—Leydig, Voit, Osann, Mayer & Holt, Ltd.

[57] ABSTRACT

A detachable plastic carrying handle having a non-circular aperture at each end which is aligned and snapped over the non-circular head of a post integrally formed on each end of a plastic battery casing and the handle is then rotated upward to cause non-alignment of the aperture and head.

3 Claims, 7 Drawing Figures

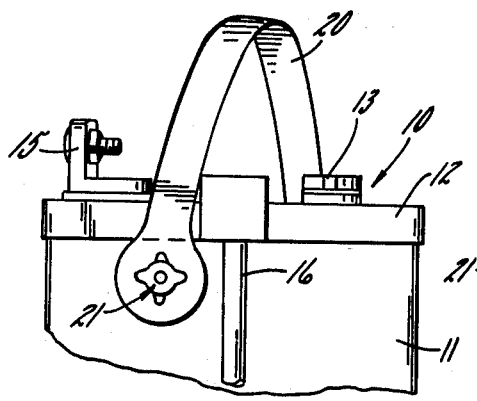
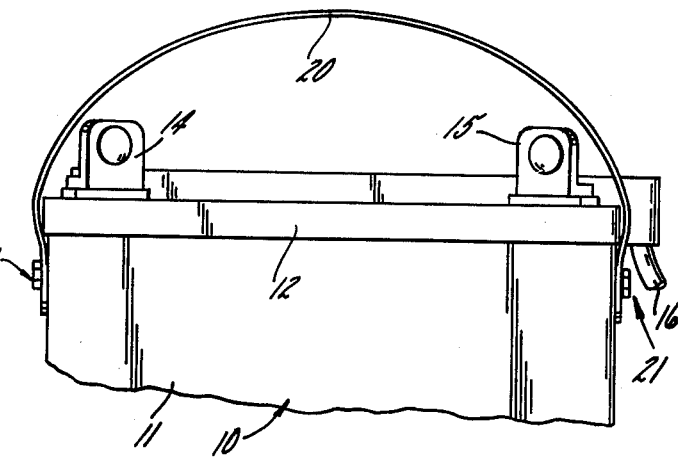
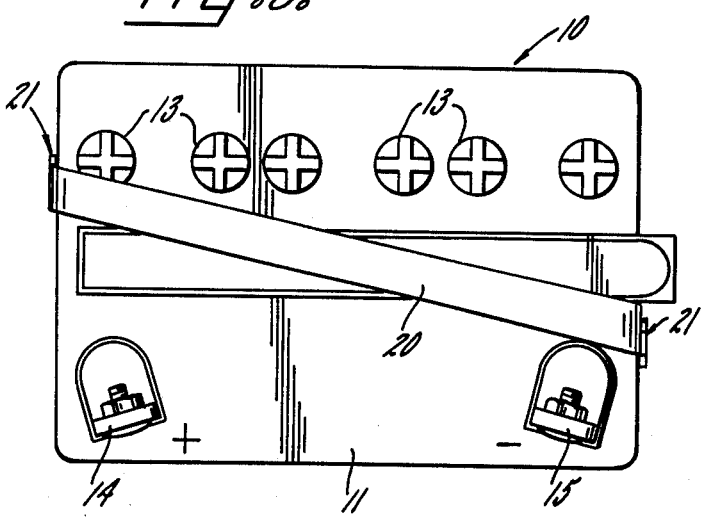
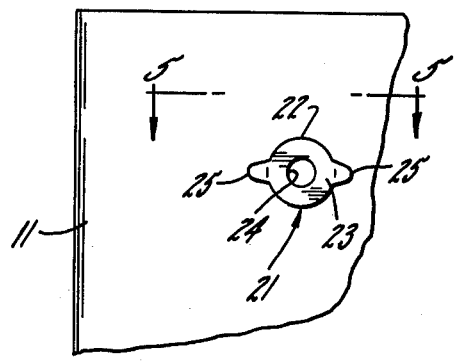
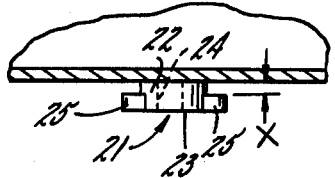
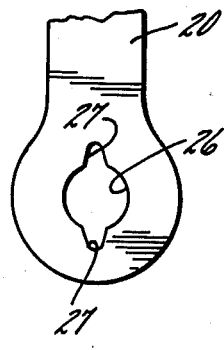
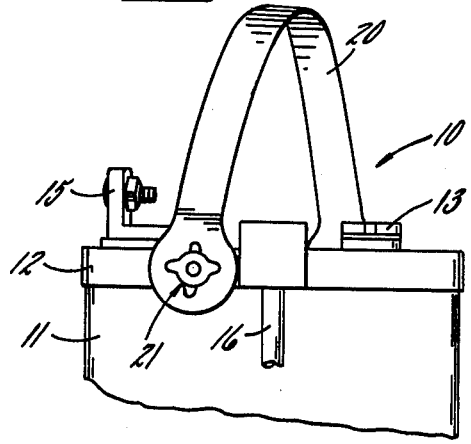

DETACHABLE BATTERY CARRYING HANDLE

BACKGROUND OF THE INVENTION

The present invention relates to battery carrying handles and more particularly concerns a detachable battery carrying handle.

In many instances, such as marine, recreational and garden equipment usage, it is desirable to provide storage batteries with convenient carrying handles. Previously such handles were often attached to the battery by molding the ends of the handle into the battery case or cover. Various examples of this method are disclosed in U.S. Pat. No. 3,845,542 to Sabatino and the references cited therein. Frequently, however, it is also desirable to quickly detach the carrying handle from the battery without destroying the handle or its anchoring structure.

Accordingly, it is the primary aim of the present invention to provide a detachable carrying handle for a battery which is economical to manufacture, simple to attach, and detach, and yet strong and reliable in use.

A more specific object is to provide a detachable plastic carrying handle for a battery having a plastic case wherein the handle attaching means may be formed integrally with the plastic case.

It is also an object to provide a carrying handle of the above type which may be quickly and conveniently snapped on and locked in place on the battery.

These and other objects and advantages of the invention will become apparent upon reading the following detailed description and upon reference to the drawings, in which:

BRIEF DESCRIPTION OF THE DRAWINGS

FIG. 1 is an end view of the upper portion of a storage battery with the detachable handle of the present invention in place;

FIGS. 2 and 3 are side elevation and plan views of the upper portion of the battery shown in FIG. 1;

FIGS. 4 and 5 are enlarged fragmentary end and plan views of the battery showing the post to which the handle is attached;

FIG. 6 is an enlarged fragmentary plan view of one end of the handle; and,

FIG. 7 is an end view similar to FIG. 1 with the detachable handle attached to a post on the end of the cover.

DETAILED DESCRIPTION OF THE INVENTION

While the invention will be described in connection with certain preferred embodiments and procedures, it will be understood that I do not intend to limit the invention to those specific embodiments and procedures. On the contrary, I intend to cover all alternatives, modifications and equivalents as may be included within the spirit and scope of the invention as defined by the appended claims.

Turning now to the drawings, there is shown in FIG. 1 the upper portion of a battery 10 including a case 11 and a cover 12. The cover 12 includes the usual vent caps 13 and positive and negative terminals 14 and 15, respectively (see FIG. 3). The illustrated battery 10 is particularly suited for lawn and garden equipment usage and preferably is provided with a safety vent 16.

In accordance with the present invention, the battery 10 is provided with a detachable carrying handle 20 removably secured to posts 21 on either end of the battery case 11 which is preferably formed of thin-wall plastic material such as polypropylene. As more particularly shown in FIGS. 4 and 5 each post 21 includes a stem 22 which protrudes from the outer surface of the end of the casing and a head 23 which is spaced from the end surface a predetermined distance $x$. Preferably, since the posts 21 are integrally molded of plastic with the casing 11, the stem 22 and head 23 are formed with a hollow center 24 to reduce shrinkage of the posts 21 relative to the wall of the casing 11 and thus reduce uneven stress which could be a source of failure.

Pursuant to the invention, the head 23 of each of the posts 21 is of non-circular configuration having a predetermined angular orientation with respect to a vertical plane passing axially through the post. As shown in FIG. 4, the head 23 of a preferred form of post 21 is provided with a pair of oppositely disposed lobes 25 which project substantially horizontally from either side of the head 23. It should be appreciated, however, that the posts 21 may be provided with heads having more or less than two lobes 25 and, indeed, may be formed of other non-circular cross-sectional shapes, e.g., triangular, square, hexagonal, etc. without departing from the present invention.

Referring to FIGS. 1-3 and 6, the handle 20 is adapted to span the length of the cover 12 and at each end of the handle there is formed a non-circular aperture 26 shaped to receive one of the noncircular heads 23 of the posts 21. In keeping with the invention the apertures 26 have an angular orientation with respect to the center line of the handle 20 different than the angular relation of the head 23 to the vertical. Thus, as more particularly shown in FIG. 6, each of the apertures 26 is formed with a pair of oppositely disposed notches 27 which project radially outwardly substantially on the center line of the handle.

To attach the handle 20 to the battery 10, the aperture 26 at one end of the handle is aligned with one of the heads 23 of the posts 21. In the illustrated embodiment, the end of the handle is held substantially horizontally to align the notches 27 with the lobes 25. The material of the handle surroundng the aperture 26 is then pushed toward the end of the battery causing the head 23 to be pressed through the aligned aperture 26. Rotating the center of the handle upward causes the notches 27 to move out of alignment with the lobes 25 and thus the end of the handle 20 is held securely in place on the post 21 by the non-circular head 23. The other end of the handle 20 is attached to the other post 21 in the same way. To detach the handle 20 from the battery 10 the foregoing steps are essentially reversed, i.e., the ends of the handle are rotated to bring the non-circular apertures 26 into alignment with the non-circular heads 23 and the heads are pressed out through the aligned apertures.

In order to facilitate carrying the battery 10 by the handle 20, the center of the handle is preferably located directly above the center of gravity of the battery. Thus, while each of the posts 21 is laterally offset at each end of the battery in opposite directions from the longitudinal center line of the battery, a vertical plane passing through the axes of the posts 21 also passes substantially through the center of gravity of the battery.

While the posts 21 in the preferred embodiment are formed integral with the ends of plastic case 11 (see FIGS. 1-5), it should be appreciated that the posts 21 could be formed on the ends of the cover 12 as shown in the modified embodiment of FIG. 7. By way of example the case and the cover may be formed of polypropylene plastic having wall thicknesses on the order of about 0.06 to 0.10 of an inch. The stem 27 of the post may have an external diameter of about 0.436 of an inch and an internal diameter of about 0.186 in the hollowed out portion 24. This provides the post 21 with a nominal wall thickness of about 0.125 of an inch or about twice the minimum wall thickness of the case 11. The handle also made of polypropylene plastic may have a nominal width of about 0.625 of an inch and a thickness on the order of about one-tenth of that. Preferably, as shown in FIG. 6, the end of the handle 20 is enlarged to provide substantially the same amount of material surroundng the aperture 26 as in the balance of the handle. The foregoing illustrative dimensions have been found satisfactory for supporting and carrying a battery 10 weighing on the order of about 20 pounds with the detachable handle 20 of the present invention.

I claim as my invention:

1. A carrying handle arrangement for a battery having a thin-wall plastic case and cover with positive and negative battery terminals located on the top surface thereof and means projecting outwardly from one end of the cover substantially past the end of the case, comprising in combination, one of said case and cover having integrally formed rigid plastic post protruding horizontally from opposite vertical surfaces thereof at either end and laterally offset in equal and opposite directions from the longitudinal center line of said case such that a vertical plane passing through the center of said posts also passes substantially through the center of gravity of the battery, each of said posts having a hollow stem portion with a closed inner end secured to said surface and a hollow non-circular head spaced from said surface a predetermined distance, said non-circular head having a predetermined angular orientation with respect to a vertical plane passing axially through said post, and an elongated handle adapted to span the length of said cover without substantial interference with said battery terminals and said projecting means and having at each end thereof an aperture shaped to receive one of said non-circular heads and having an angular orientation with respect to the center line of said handle different than said predetermined angular relation of said head to said vertical plane, said ends of said handle having a thickness adjacent said apertures adapted to fit within said predetermined distance without substantial end play.

2. A carrying handle arrangement as defined in claim 1 wherein said head is formed with at least one lobe thereon.

3. A carrying handle arrangement as defined in claim 1 wherein said handle is formed of substantially flat plastic strap material.

* * * * *